United States Patent [19]

Dörflinger et al.

[11] Patent Number: 5,358,605
[45] Date of Patent: Oct. 25, 1994

[54] PROCESS FOR RECYCLING WASTE PAPER

[75] Inventors: Hans-Dieter Dörflinger; Michael Schwarz, both of Heidenheim, Fed. Rep. of Germany

[73] Assignee: J. M. Voith GmbH, Heidenheim, Fed. Rep. of Germany

[21] Appl. No.: 25,956

[22] Filed: Mar. 3, 1993

[30] Foreign Application Priority Data

Mar. 4, 1992 [DE] Fed. Rep. of Germany ....... 4206748
May 12, 1992 [DE] Fed. Rep. of Germany ....... 4215532
Jun. 26, 1992 [DE] Fed. Rep. of Germany ....... 4221028

[51] Int. Cl.⁵ .................................................. D21B 1/08
[52] U.S. Cl. ........................................ 162/4; 162/55; 162/60; 209/168; 210/512.1
[58] Field of Search .............. 162/4, 55, 60; 209/162, 209/166, 168, 211; 210/512.1

[56] References Cited

U.S. PATENT DOCUMENTS

| | | | |
|---|---|---|---|
| 4,151,093 | 4/1979 | Krofta | 210/386 |
| 4,686,005 | 8/1987 | Biondetti et al. | 162/60 |
| 4,722,793 | 2/1988 | Seifert et al. | 210/401 |
| 4,908,125 | 3/1990 | MacKenzie et al. | 209/166 |
| 5,094,674 | 3/1992 | Schweiss et al. | 210/512.1 |

FOREIGN PATENT DOCUMENTS

| | | |
|---|---|---|
| 1517227 | 2/1969 | Fed. Rep. of Germany . |
| 2138072 | 2/1973 | Fed. Rep. of Germany . |
| 2610581 | 8/1977 | Fed. Rep. of Germany . |
| 2904618 | 9/1989 | Fed. Rep. of Germany . |
| 1361934 | 7/1974 | United Kingdom . |
| 1535001 | 12/1978 | United Kingdom . |

*Primary Examiner*—W. Gary Jones
*Assistant Examiner*—Dean T. Nguyen
*Attorney, Agent, or Firm*—Marshall, O'Toole, Gerstein, Murray & Borun

[57] ABSTRACT

The invention concerns the recycling of waste paper in a deinking process with flotation with at least one other cleaning stage downstream. According to the invention, selective flotation is performed in multiple stages. After no more than a third flotation stage, the flotation foam collected up to that point is removed and purified by means of flash flotation, which produces sludge, clear water and separated foam that contains the contaminants from the waste paper feed. Subsequently, the sludge is removed from the paper recycling process. Large impurities are removed from the sludge (foam) (except for the foam from up to the three last stages) in up to two washing units (including thickeners) or screen units. The fibers are then separated from the relatively fine contaminants, and these contaminants are primarily removed as sludge from the resulting low-fiber fractions by flash flotation. The fiber-containing fraction and the clear water from flash flotation is recycled to a point prior to the selective flotation system.

17 Claims, 2 Drawing Sheets

PROCESS FOR RECYCLING WASTE PAPER

BACKGROUND OF THE INVENTION

The invention is directed to a method of recycling waste paper in a deinking process with flotation and at least one additional downstream cleaning step. A variety of such deinking processes are known in the art.

An essential component of modern deinking systems is selective flotation, which results in extensive removal of printing inks from the fiber suspension formed during flotation with minimal loss of fibers. However, this step yields foam that is highly contaminated with printing inks and also has a considerable reusable fiber content. Workup of this foam is an important problem of deinking plants.

According to the processes described in German Patent Nos. 15 17 227 (Jul. 17, 1975) and 26 10 581 (Aug. 11, 1977), such foam is purified in a centrifuge to produce relatively clear water and sludge. The sludge is discarded and the clear water, although still highly contaminated, is purified in a clarification system in the paper plant. Naturally, this leads to a great burden on the clarification system. The loss of fibers can be minimized only by performing so-to-speak fractionation (i.e. purification) of the foam of preceding flotation stages in secondary cells. However, this does not avoid a heavy burden on the clarification system.

SUMMARY OF THE INVENTION

It is an object of the invention to overcome one or more of the problems described above.

The invention provides a waste paper recycling process that functions with a high fiber yield and generates a minimal amount of waste, and consequently is relatively inexpensive.

According to the invention, selective flotation is performed in multiple stages.

After up to the first three flotation stages, the flotation foam collected up to that point is removed and purified by means of flash flotation, which produces sludge, clear water and separated foam that contains the contaminants from the waste paper feed. Subsequently, the sludge is removed from the paper recycling process.

Large impurities are removed from the sludge (foam) (except for the foam from up to the three last stages) in one or two washing units (including thickeners) or screen units. The fibers are then separated from relatively fine contaminants, and these contaminants are mostly removed as sludge from the low-fiber fractions by flash flotation. The fiber-containing fraction and the clear water from flash flotation is recycled to a point prior to the flotation system.

Other objects and advantages of the invention will be apparent to those skilled in the art from a review of the following detailed description, taken in conjunction with the drawings and the appended claims.

DETAILED DESCRIPTION OF THE INVENTION

By connecting screen sorting equipment downstream from a selective flotation system, it is possible to obtain excellent fiber recovery, a minimal amount of liquid to be subjected to flash flotation, sludge of a relatively high consistency that can easily be thickened to a consistency suitable for dumping, and relatively high purity of the process water recycled from flash flotation.

Flash flotation works with very fine bubbles, and therefore is often referred to as microflotation, and is regarded as "total flotation" which separates the components from the liquid without regard for type. This process is also referred to by those skilled in the art as dissolved air flotation. According to the invention, the flash flotation unit can be designed to be relatively small, resulting considerable savings. Furthermore, the cost of the flocculation chemicals necessary for flash flotation is low.

On the other hand, secondary selective flotation cells can be eliminated in a selective flotation system if the foam from one or more of the first primary selective flotation stages, optionally only the first stage, is sent to flash flotation in order to obtain clear water. In this case, the fiber losses are also low and the foam of the subsequent stages of selective flotation is recycled back to before the first primary selective flotation stage. In any case, it is desirable to introduce the clear water from flash flotation at a point before selective flotation in order to achieve the low consistency of the fiber suspension required there.

Figure 1:
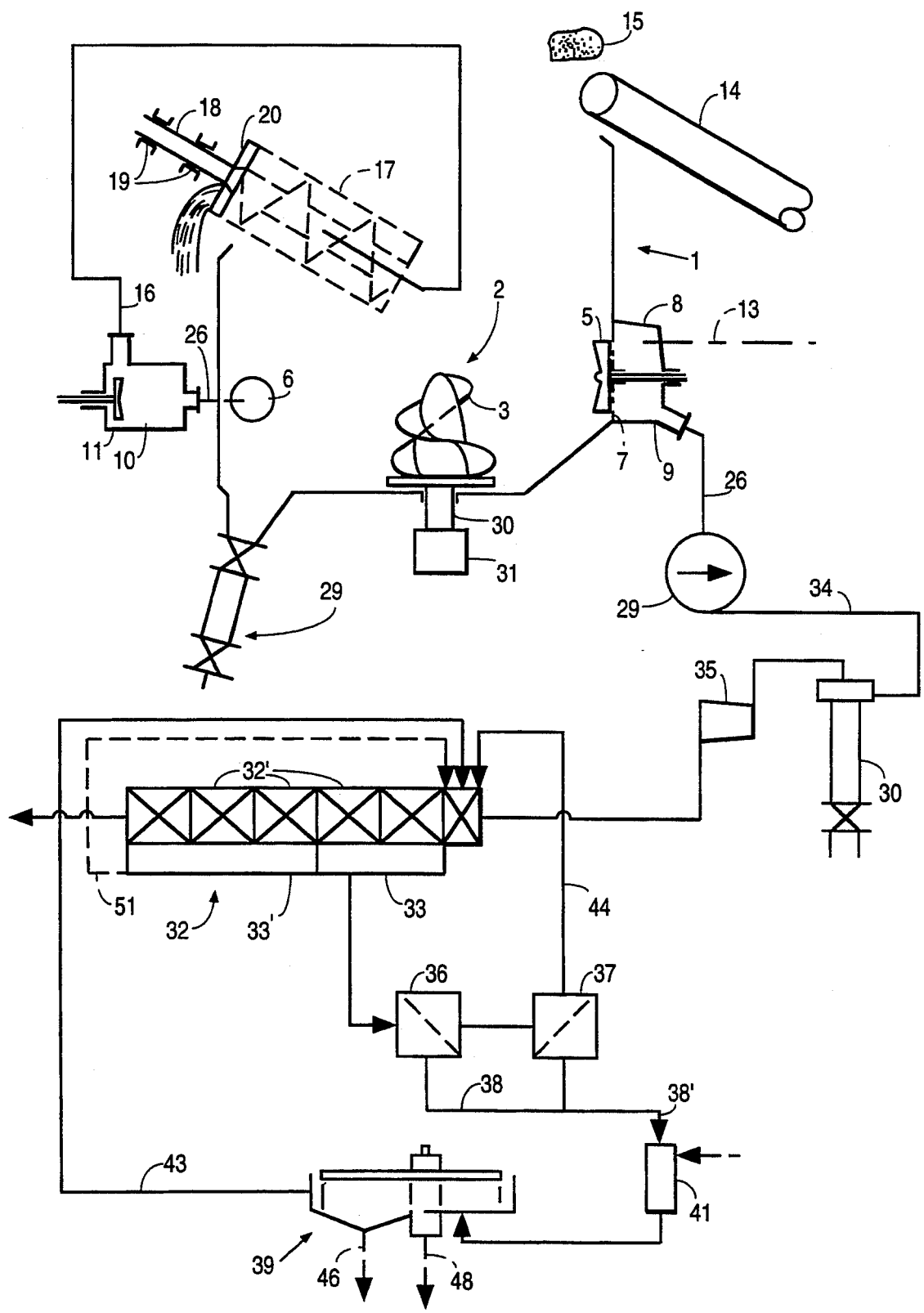
FIG. 1 is a schematic diagram of a deinking system according to the invention.

Turning now to FIG. 1, in general the paper to be recycled is sent in the form of bales by means of plate conveyor belts 14 to a heater device in the form of a pulper 1. By adding water and optional pulping chemicals, the paper to be recycled is generally pulped at or to a relatively high consistency of about 15 wt. %. A rotor 2 with helical ribs 3 induces or enhances the pulping effect.

In order to achieve preliminary separation of large and/or heavy impurities from the fiber suspension, a portion of the suspension is directed through an orifice 6 and a line 26 to a fluidization apparatus 10 with an impeller-like rotor 11, which turn directs the suspension into a sorting device, which is illustratively a rotary screen drum 17. The drum 17 is illustratively mounted by means of an arm 20 on a shaft 18 which rotates in bearings 19.

The rotor 2 is driven by means of a shaft 30 and a drive motor 31. A heavy dirt trap 29 serves to separate particles of metal or similar heavy components from the bales of waste paper.

The pulped fiber suspension is withdrawn through a screen 7 to a separate chamber 8, where separation is facilitated by an additional rotor 5. The suspension is directed through an outlet 9 of the chamber 8, through a line 26 and a pump 29.

In general, the suspension leaving the chamber 8 has a relatively low pumpable consistency of about 4 to 6 wt. % due to dilution water added to the chamber 8 through a line 13. The suspension then goes through a line 34 to a vortex cleaner 30, then to a deflaker 35, and then to a flotation system 32 comprising multiple stages 32' connected in series.

The flotation system 32 effects selective flotation in order to retain most of the fibers in the process and separate the printing inks therefrom, and transfer of the separated foam containing the printing inks to foam troughs by means of an overflow. The illustrated foam trough is subdivided into two portions 33 and 33' so that the foam from only the first two selective flotation stages, for example, is sent downstream. However, such subdivision is not necessary and, alternatively, all the foam may be sent to downstream screen sorting stages 36 and 37.

In FIG. 1, dotted lines indicate that any remaining foam not sent down into the foam trough is returned through a line 51 to a point before the first stage of the selective flotation system 32.

Preferably, scrubbers or especially ink screen sorters with screen baskets are used as the screen sorters 36 and 37. In this case, the screen basket of the first screen sorting stage 36 preferably has perforations in the form of holes with diameters between about 0.3 mm and about 0.5 mm and the screen basket of the second screen sorting stage 37 has perforations in the form of slots with slot widths between about 0.05 mm and about 0.1 mm.

In the first screen sorting stage 36, large particles, especially particles of plastic and similar materials, are separated, whereas in the second screen sorting stage the fibers are separated from the liquid and are effectively washed. In this step, separation of the fibers from the fine contaminants provides a low-fiber fraction and a fiber-rich fraction. The fibers are returned through a line 44 to a point before the selective flotation system 32 or they are sent to the mixing chamber. The process water separated from the screen sorting stages is processed in a flash flotation system 39, i.e. it is clarified and the clear water is recycled through a line 43, preferably also to a point before the selective flotation system 32 (e.g., just before the first selective flotation stage).

Lines 38 and 38' carrying the liquid to be purified extend from the screen sorters 36 and 37 to a gas dispersion reactor 41 where the liquid is enriched with air by means of injectors. The air-enriched liquid is then sent to the flash flotation system 39. Contaminants are removed in the form of sediment from the flash flotation system 39 through a line 46 and in the form of sludge or foam through a line 48, from which the sludge is shoveled out. This sludge or sediment is obtained with a consistency between 6 and 8 wt. % and can easily be thickened further so it is suitable for dumping. The clarified water exiting the flash flotation system 39 is then preferably sent via line 43 to a point before the selective flotation system 32.

Figure 2:
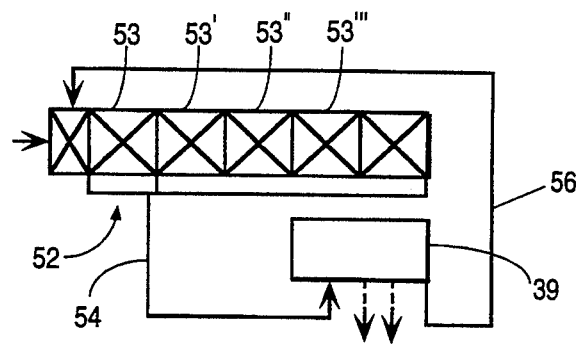
FIG. 2 is a schematic diagram of portion of another embodiment of a deinking system according to the invention.

In FIG. 2, the first portion of the deinking plant (not shown here) corresponds to that in FIG. 1, and a selective flotation system 52' has individual stages 53, 53', 53'', 53''', etc. In this case, a flash flotation system 39 receives the foam from only the first flotation stage 53 via a line 54. The clear water from the flash flotation system 39 is returned to a point before the primary selective flotation system 52 through a line 56. The foam from the other stages of the selective flotation system is sent back to a point before the first stage thereof. This is a system with a very simple design which is relatively inexpensive and nevertheless has a good cleaning effect. A relatively small amount of sludge with a relatively high consistency is obtained, as in the case of FIG. 1.

Of course, it is also possible to direct the sludge from several of the first stages (e.g. up to the first three stages) of the selective flotation system to the flash flotation plant and purify it there.

The two sorting stages 36 and 37 may also be replaced by a washing unit, preferably in combination with a downstream thickener. A variety of suitable washing units is known in the art, such as for example an inclined screen washing unit, or a unit according to U.S. Pat. No. 4,686,005 (Aug. 11, 1987) or German Patent No. 29 04 618 (Sep. 14, 1989). Suitable thickening equipment is also disclosed in German Patent No. 21 38 072 (Oct. 31, 1973) and U.S. Pat. No. 4,722,793 (Feb. 2, 1988). A large number of other systems is known in the art.

Figure 3:
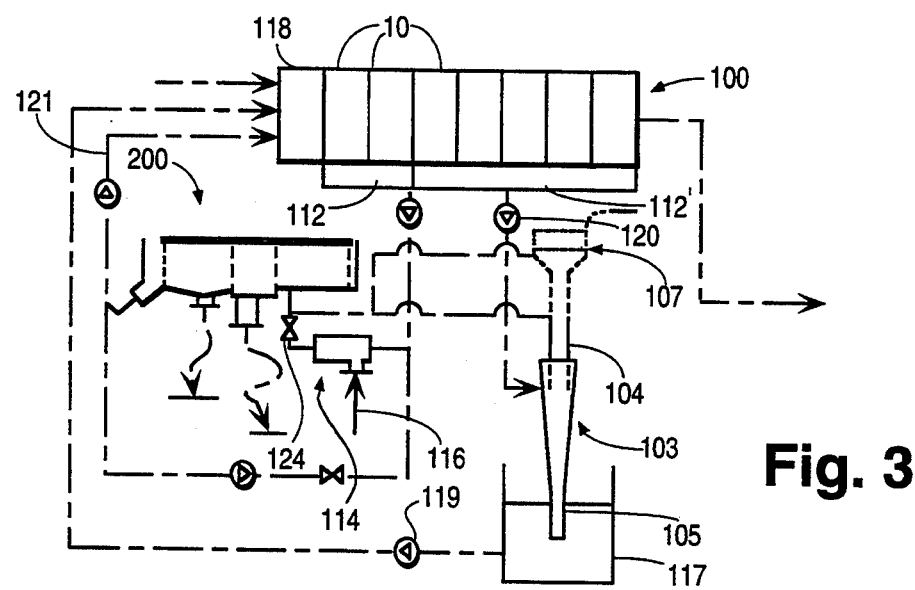
FIG. 3 is a schematic diagram of a further embodiment of a deinking system according to the invention.

However, as described below in connection with FIG. 3, it is also possible to use a system with a simpler design which results in a relatively small amount of waste. It is also possible to design the system such that the foam that is supplied to the flash flotation system is directed to washing equipment, or to screening equipment in combination with washing equipment. Due to the elimination of the secondary selective flotation system, this also yields the advantage of easier control and operation of the system.

A primary selective flotation system 100 includes a series of individual flotation cells 10, 10', 10'', etc. that are connected in series. Each cell 10, etc. has a collecting trough, illustratively subdivided into two parts 112 and 112' (e.g., two or more cells may share a collecting trough part 112), for removing foam. The foam from the first trough part 112 goes to a microflotation system 200, which is a flash flotation system and yields total flotation. This system yields clear water which is directed through a line 121 to a point before the selective flotation system 100.

Highly contaminated sludge that is generated in the flash flotation system 200 is discarded. In general, this sludge floats in the form of foam, but some of it may also be removed as sediment at the bottom of the system. The remaining foam, namely the foam from the trough part 112' is sent tangentially by a pump 120 to a hydrocyclone 103 which has an upper discharge 104 for the gas-containing core and a bottom drain 105 for a heavy fraction with a relatively low contaminant particle content. The gas-containing core also has a certain fiber content. The remainder of the fibers go through a drain tube 105 with some of the contaminant particles, and are returned to a point before the selective flotation system 100 (i.e. to a mixing chamber 118). Preferably, a hydrocyclone that tapers conically in the direction of the drain for the heavy fraction is utilized.

In this way, the objective of eliminating the secondary stage of the selective flotation system is achieved.

Of course, it is also possible to prepurify the suspension sent to the flash flotation system 200 in washing equipment combined with screen equipment in order to achieve separation of fibers. A hydrocyclone is possible at this point but is not preferred. It is preferred to send the core fraction which may still contain gas from the cyclone 103 to the flash flotation system 200.

Although there is a high burden in this embodiment on the first flotation stages 10, a relatively high degree of separation is attainable. The later stages have hardly any increased burden compared to the corresponding primary stages, if the secondary flotation stage was installed. However, the number of stages can also be increased by one or two, resulting in the great advantage of simpler operation and control because a secondary stage of selective flotation, which would otherwise be necessary, is eliminated.

The drain 105 of the hydrocyclone preferably empties into a collecting tank 117 from which a pump 119 conveys the suspension to the mixing chamber 118 for selective flotation.

The flash flotation system 200 also includes a gas reactor 114 with a gas line 116 from which the suspension is sent at a pressure between about 4 and about 7 bar to the main flash flotation system 200 after addition of flocculation chemicals through a decompression valve 124 together with a certain portion of recycled water (i.e. clear water obtained in flash flotation).

A degassing (defoaming) head element 107 may be connected to the line 104 above the upper opening the cyclone 103 in order to remove most of the air and destroy any bubbles.

Another goal is to achieve the lowest possible load on the primary stage of the selective flotation system. Due to the use of the flash flotation system, the foam removed from the system and sent to the secondary selective flotation system no longer has a high load of contaminants, so that it is possible to direct the good stock from the secondary stage of the selective flotation system on to the process as accepted stock without further flotation.

This embodiment of the invention is explained in greater detail below with reference to FIG. 4, from which depictions of required pumps are omitted.

Figure 4:
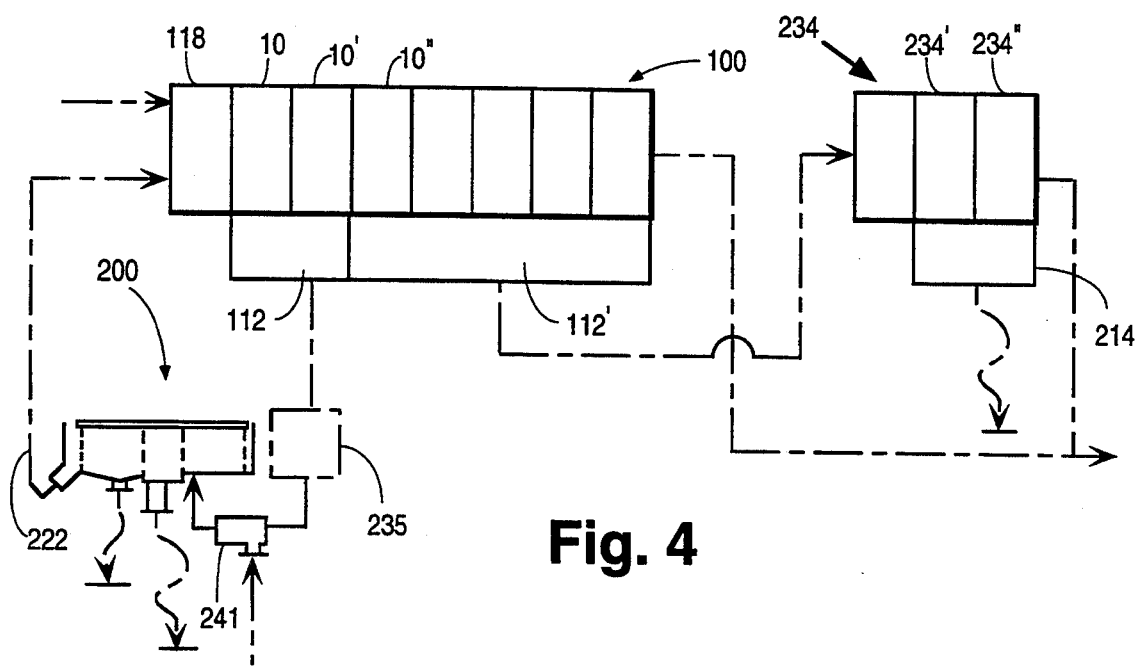
FIG. 4 is a schematic diagram of another embodiment of a deinking system according to the invention.

In FIG. 4, the primary stage of the selective flotation system 100 has a series of connected flotation cells 10, 10', 10'', 10''', etc. having a foam trough which is illustratively subdivided here into two parts 112 and 112'. The foam from the first trough part 112 is sent to a flash flotation system 200 which is illustratively equipped with an upstream gas reactor 241. The remaining foam goes from the trough part 112' to a secondary stage 234 of the selective flotation system which here consists of two successive stages 234' and 234''. A foam trough 214 is provided.

The foam in the trough 214 can be discarded, but it is preferable to direct it to the flash flotation system 200 where it is separated into sludge which is discarded and clear water, all or part of which is sent through a line 22 to a point before the primary selective flotation system 100. The foam from one to three of the first stages 10, 10', 10'', etc. of the primary selective flotation system 100 is sent to the flash flotation system 200. The foam which then remains in the trough part 112' of the primary selective flotation stage no longer has such a high load of contaminant particles, so that the accepted stock of the secondary selective flotation system 234 need not be subjected to further flotation. In the past it was conventional to return this accepted stock back to a point before the primary selective flotation system 100, which constituted a great burden on this primary system, especially with regard to the first selective flotation cells 10 and 10'.

A system with washing equipment and/or screen equipment, optionally in combination, is indicated with dash-dot lines by the reference numeral 235.

The foregoing detailed description is given for clearness of understanding only, and no unnecessary limitations are to be understood therefrom, as modifications within the scope of the invention will be apparent to those skilled in the art.

We claim:

1. A process for recycling waste paper containing fine contaminants and, optionally, large impurities in a deinking process comprising a selective flotation system having at least one additional cleaning stage downstream of said selective flotation system and wherein said selective flotation system comprises multiple stages, said process comprising the steps of:
   (a) performing a selective flotation procedure in said selective flotation system, said procedure comprising at least three stages, and wherein said selective flotation procedure generates foam;
   (b) collecting said foam from step (a) at a point up to the three initial stages of said selective flotation procedure;
   (c) removing and purifying said foam of step (b) by means of microflotation to provide clear water and separated foam or sludge containing said contaminants; and
   (d) removing said foam or sludge from the paper recycling process.

2. The process of claim 1, further comprising the step of:
   further thickening said foam or sludge of (c) prior to removing said foam or sludge from the paper recycling process.

3. The process of claim 1 wherein said at least three stages of said selective flotation procedure includes a first stage and wherein foam from only up to the first three stages of said selective flotation procedure is directed to a microflotation system, said process further comprising the steps of:
   returning the foam of the remaining downstream selective flotation stages to the start of the first selective flotation stage and returning the clear water from step (c) to the start of the selective flotation procedure.

4. The process of claim 1, further comprising the steps of:
   directing the foam not sent to the microflotation system to a hydrocyclone having a core and a lower end;
   removing from the core a light fraction comprising light particles and gas, and removing a heavy fraction from the lower end; and,
   directing said heavy fraction to the start of the selective flotation procedure and directing the light core fraction to the microflotation procedure.

5. The process of claim 4 wherein said core is vertical and said light fraction is discharged from said core at the upper end thereof.

6. The process of claim 4 wherein only the foam of up to the first two stages of the selective flotation procedure is directed to the microflotation procedure.

7. The process of claim 6 wherein there is no secondary selective flotation procedure.

8. The process of claim 6 wherein the foam directed to the microflotation procedure is directed through a washing system, or to a screen unit, said screen unit having a washing effect or being combined with washing equipment.

9. The process of claim 1 wherein the remaining foam from a primary stage of the selective flotation procedure is sent to a one-to three-stage secondary selective flotation system, from which the resulting accepted stock is not subjected to further flotation.

10. The process of claim 9 wherein the accepted stock from the secondary selective flotation system is mixed with the accepted stock from a primary selective flotation system.

11. The process of claim 9 wherein at most the foam from up to the first two stages of the primary selective flotation procedure is directed to the microflotation system.

12. The process of claim 1, further comprising the steps of:
(e) removing, in up to two washing or screen units prior to step (c), any large impurities from the foam of step (b);
(f) separating, either before or after step (e), paper fibers from said foam of step (b) to provide a low-fiber fraction and a fiber-rich fraction, prior to step (c); and
(g) recycling the fiber-rich fraction and the clear water resulting from said microflotation to a point prior to said selective flotation procedure;
(h) wherein said step (c) comprises removing said fine contaminants primarily as foam or sludge from said low-fiber fraction by microflotation.

13. The process of claim 12 wherein:
said large impurities are removed prior to said separating step (f).

14. The process of claim 12 wherein steps (e) and (f) comprise a two-stage screen sorting procedure, said screen sorting procedure comprising the steps of:
(i) removing, in a first sorting stage, large impurities to define a first fraction;
(j) removing, in a second sorting stage, fiber material to define a second fraction;
(k) recycling said fibers to the start of said selective flotation system; and
(l) following the sorting stages (i) and (j), directing the resulting contaminant-rich material along with said first fraction to said microflotation procedure.

15. The process of claim 14, further comprising the step of:
providing a first screen unit and a second screen unit connected in series and disposed downstream from the selective flotation system, wherein said first screen unit comprises a screen sorter with a screen basket having perforations between about 0.3 mm and about 0.5 mm in diameter, and said second screen unit comprises a screen sorter with a screen basket with slotted perforations with slot widths between about 0.05 mm and about 0.1 mm in size.

16. The process of claim 15 wherein all the foam from the selective flotation system is sent to said screen sorters.

17. The process of claim 12 wherein foam from only up to the first three stages of said selective flotation procedure is directed to a microflotation system and the foam of the remaining downstream flotation stages is returned to the start of the first selective flotation stage and the clear water from microflotation is returned to the start of the selective flotation procedure.

* * * * *